(12) United States Patent
Zhang et al.

(10) Patent No.: US 11,493,426 B2
(45) Date of Patent: Nov. 8, 2022

(54) DEVICE AND METHOD FOR ADJUSTING A SIGNAL FOR AN OBJECT DETECTOR

(71) Applicant: Deere & Company, Moline, IL (US)

(72) Inventors: Haifeng Zhang, Fargo, ND (US); Ryan J. King, West Fargo, ND (US); Kevin P. Cowles, Fargo, ND (US); Jason A. Jelinek, Fargo, ND (US); Waylon R. Lindseth, Fargo, ND (US); Caleb A. Perkinson, Fargo, ND (US); Jeffrey S. Puhalla, Hawley, MN (US)

(73) Assignee: DEERE & COMPANY, Moline, IL (US)

( * ) Notice: Subject to any disclaimer, the term of this patent is extended or adjusted under 35 U.S.C. 154(b) by 166 days.

(21) Appl. No.: 16/945,518

(22) Filed: Jul. 31, 2020

(65) Prior Publication Data

US 2021/0131941 A1 May 6, 2021

Related U.S. Application Data

(60) Provisional application No. 62/928,809, filed on Oct. 31, 2019.

(51) Int. Cl.
*G01N 15/14* (2006.01)
*G01V 8/20* (2006.01)
*G06M 1/272* (2006.01)

(52) U.S. Cl.
CPC ........... *G01N 15/1429* (2013.01); *G01V 8/20* (2013.01); *G06M 1/272* (2013.01); *G01N 2015/1486* (2013.01)

(58) Field of Classification Search
CPC ........... A01C 7/107; A01C 7/105; A01C 7/04; G01M 1/101; G01M 7/00; G06M 7/02;
(Continued)

(56) References Cited

U.S. PATENT DOCUMENTS 4,159,064 A 6/1979 Hood
4,163,507 A 8/1979 Bell
(Continued)

FOREIGN PATENT DOCUMENTS

EP 0380186 A2 8/1990
EP 1772048 B1 10/2012
(Continued)

OTHER PUBLICATIONS

Novelty Search Report Case No. P28124 titled Optical particle counter using a LED/photodiode(s) pair and optical lens, dated Aug. 17, 2018 (3 pages).
(Continued)

*Primary Examiner* — John R Lee
(74) *Attorney, Agent, or Firm* — Crowell & Moring LLP

(57) ABSTRACT

An object counting device adjusts a signal to account for noise to improve object counting accuracy. A controller receives an electromagnetic radiation (e.g., light) intensity signal from radiation detectors and determines that its value is within a voltage threshold, thereby indicating that no object is passing through the radiation. The controller determines a derivative of the signal and that the derivative is less than a derivative threshold level for at least a predefined time. The controller then updates a base noise floor value to be the value of the radiation intensity signal to account for particles within a path of the electromagnetic radiation to improve an object counting accuracy. In some embodiments, the processor can scale the received radiation intensity signal in accordance with the updated base noise floor value.

20 Claims, 13 Drawing Sheets

(58) Field of Classification Search
CPC .......... G06M 1/04; G06M 1/27; G06M 1/272; G01V 8/20; G01N 2015/1486; G01N 15/1436; G01N 15/1434; G01N 15/1429
See application file for complete search history.

(56) References Cited

U.S. PATENT DOCUMENTS

| | | | |
|---|---|---|---|
| 4,635,215 A | 1/1987 | Friend | |
| 4,748,336 A | 5/1988 | Fujie et al. | |
| 5,847,389 A | 12/1998 | Mertins et al. | |
| 5,936,234 A | 8/1999 | Thomas et al. | |
| 5,969,340 A | 10/1999 | Dragne et al. | |
| 6,078,635 A | 6/2000 | DuBois | |
| 6,093,926 A | 7/2000 | Mertins et al. | |
| 9,140,639 B2 | 9/2015 | Pariseau | |
| 9,392,660 B2 | 7/2016 | Dias et al. | |
| 9,677,990 B2 | 6/2017 | Pariseau et al. | |
| 9,894,836 B2 * | 2/2018 | Garton | A01D 41/1273 |
| 2010/0116974 A1 | 5/2010 | Liu et al. | |
| 2011/0303137 A1 | 12/2011 | Tevs et al. | |
| 2017/0202143 A1 * | 7/2017 | Garton | A01D 41/1273 |
| 2021/0127561 A1 * | 5/2021 | King | G01N 15/1459 |
| 2021/0131941 A1 * | 5/2021 | Zhang | G06M 1/272 |

FOREIGN PATENT DOCUMENTS

| | | |
|---|---|---|
| EP | 3135090 A1 | 3/2017 |
| WO | WO 2014035949 A1 | 3/2014 |

OTHER PUBLICATIONS

Novelty Search Report Case No. P28125 titled Diagnose Optical non-uniform Variation in transmissive optical particle sensor dated Aug. 17, 20218 (3 pages).

European Search Report issued in EP20203192.8 dated Mar. 3, 2021 (7 pages).

European Search Report issued in EP20203462.5 dated Apr. 7, 2021 (10 pages).

* cited by examiner

DEVICE AND METHOD FOR ADJUSTING A SIGNAL FOR AN OBJECT DETECTOR

CROSS-REFERENCE TO RELATED APPLICATIONS

This application claims priority under 35 U.S.C § 119(e) to Provisional Application No. 62/928,809, filed on Oct. 31, 2019, the entirety of which is hereby fully incorporated by reference herein.

TECHNICAL FIELD

This disclosure relates to devices and methods for detecting objects, such as seeds, passing through a passageway.

BACKGROUND

Seeding machines typically include a passageway through which seeds pass prior to being inserted and planted into the ground. Seeding machines may include seed counting systems to count a number of seeds that pass through the passageway. However, existing seed counting systems may be effected by various factors (for example, dust from the environment in which the seeding machine is used) that may negatively affect the accuracy of the seed counting. Additionally, current designs of seed counting systems are limited by the rate at which seeds can be counted, typically with a maximum seed counting rate of 20-60 seconds, and can typically only successfully count larger grains (such as corn or soybeans).

SUMMARY

In various embodiments, an object counting device can adjust a signal to account for a level of noise in the signal to improve an object counting accuracy. A controller receives from a plurality of electromagnetic radiation (e.g., light) emitters a radiation intensity signal corresponding to an intensity of electromagnetic radiation received by the plurality of radiation detectors. The controller can determine that a value of the radiation intensity signal is within a voltage threshold, thereby indicating that no seed is passing through the electromagnetic radiation received by the plurality of radiation detectors. The controller then can determine a derivative of the radiation intensity signal and that the derivative is less than a derivative threshold level for at least a predefined elapsed time. The controller can then update a base noise floor value to be the value of the radiation intensity signal to account for particles within a path of the electromagnetic radiation received by the plurality of radiation detectors to improve an object counting accuracy. In some embodiments, the processor can scale the received radiation intensity signal in accordance with the updated base noise floor value.

In this manner, processing of received light intensity signals can be performed using, in part, the calculated base noise floor, which accounts for particles within the path of the plane of electromagnetic radiation received by the radiation detectors to improve an accuracy of an object counting system. This allows the processor to remove the effects of the noise caused by the dust, which noise may otherwise create false positive or false negative seed detection events and can interfere with or distort the changes in the received intensity signal that are truly attributable to a seed event. Accordingly, this improves the object counting accuracy of the seed counting algorithms.

DETAILED DESCRIPTION

Figure 1:
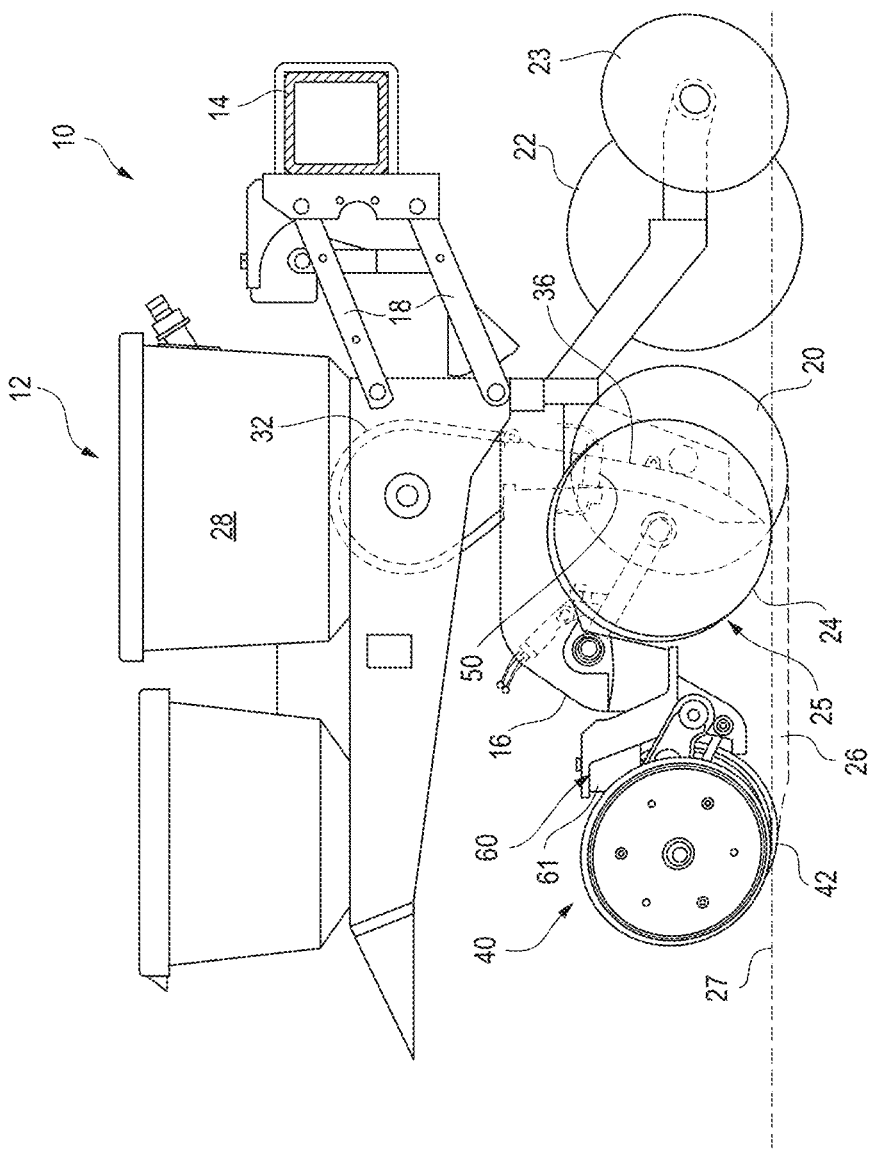
FIG. 1 shows an example planting row unit of an agricultural seeding machine according to various embodiments.

With reference to the figures, FIG. 1 shows an example row planting unit 12 of an agricultural seeding machine 10 according to various embodiments. As shown, seeding machine 10 is in the form of a row crop planter but may also be other forms of machines. FIG. 1 illustrates a single row planting unit 12 of a multi-row planter. In certain implementations, each row planting unit 12 of a multi-row planter may be substantially identical and connected to a machine frame 14 shown as a tool bar. Only a single row planting unit 12 is shown and described below in FIG. 1 for sake of simplicity. Row planting unit 12 may include a multi-part row unit frame 16 that may be attached to the tool bar by a parallel linkage 18. The tool bar is coupled to a traction unit (not shown), such as an agricultural tractor. For example, tool bar may be coupled to an agricultural tractor using a draw bar or 3-point hitch assembly. The tool bar may be coupled with transport wheel assemblies, marker arms, or other assemblies, which may be of conventional design and not shown for clarity.

In various embodiments, the frame 16 carries a double disc trench opener 20 for forming a seed trench 26 in soil 27. An optional coulter wheel 22 and row cleaner 23, particularly for use in no till situations, may be placed ahead of double disc trench opener 20. A pair of trench depth regulating members 25 in the form of gauge wheels 24 may be respectively associated with the pair of discs of the double disc trench opener 20. More particularly, each gauge wheel 24 may be positioned generally in line with and immediately adjacent to the outside of each respective disc of the double disc trench opener 20. The gauge wheels 24 may be vertically adjusted to change the depth of the trench that is cut into the soil 27 using the double disc trench opener 20. A seed meter 32 may also be carried by frame 16. The seed meter 32 receives seed from a seed hopper 28 carried above the seed meter on the frame 16. The seed meter 32 delivers seed sequentially to a passageway conduit, such as a seed tube 36, through which the seed falls into or is otherwise placed into the trench 26. The seed tube 36 may include or be integrated with an object detection device 50 (or seed detection device) to detect objects such as seeds as they pass through the seed tube 36. A trench closer assembly 40 follows behind the gauge wheels 24 to close the trench 26 after the seed tube 36 places the seed within the trench 26. In various embodiments, the trench closer assembly 40 includes a closing wheel 42 positioned generally in line with double disc trench opener 20 to push the soil 27 back into the trench 26 on top of the seeds deposited in the trench 26.

Figure 2:
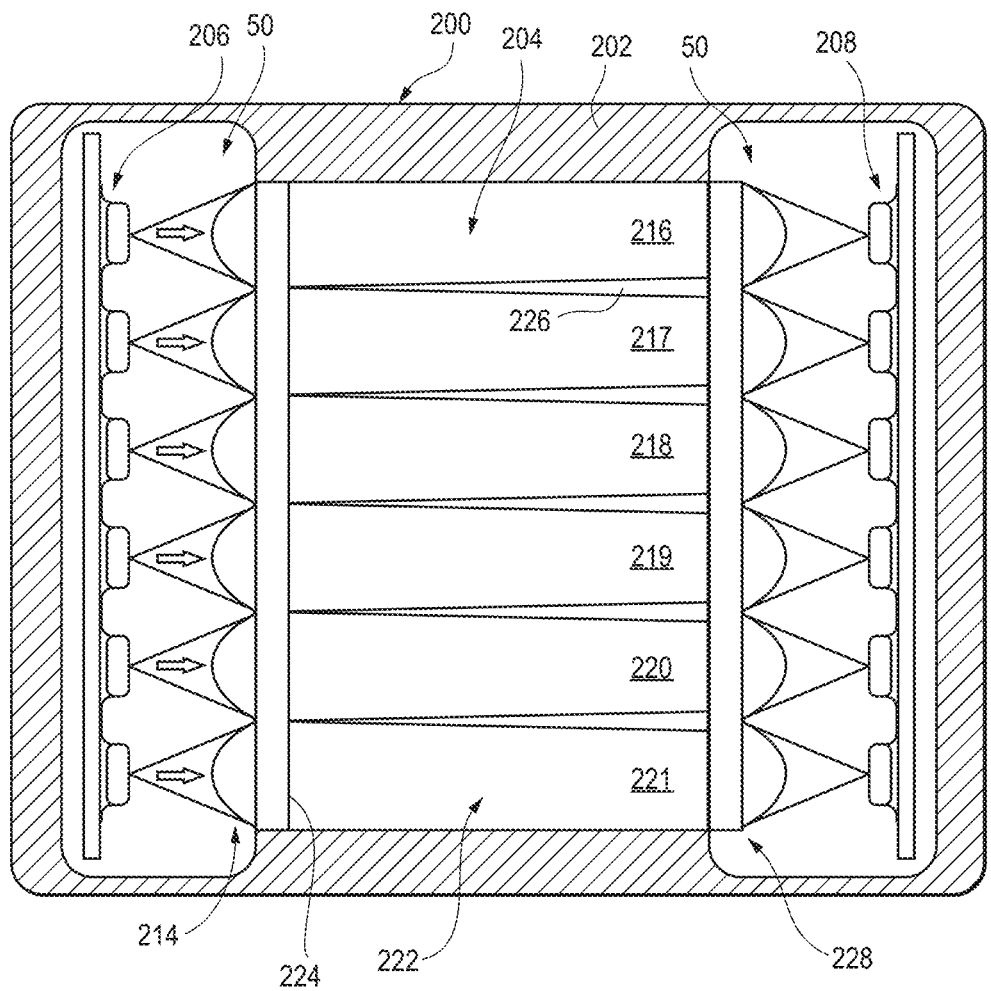
FIG. 2 shows a top-down view of the object detection device according to various embodiments.
Figure 3:
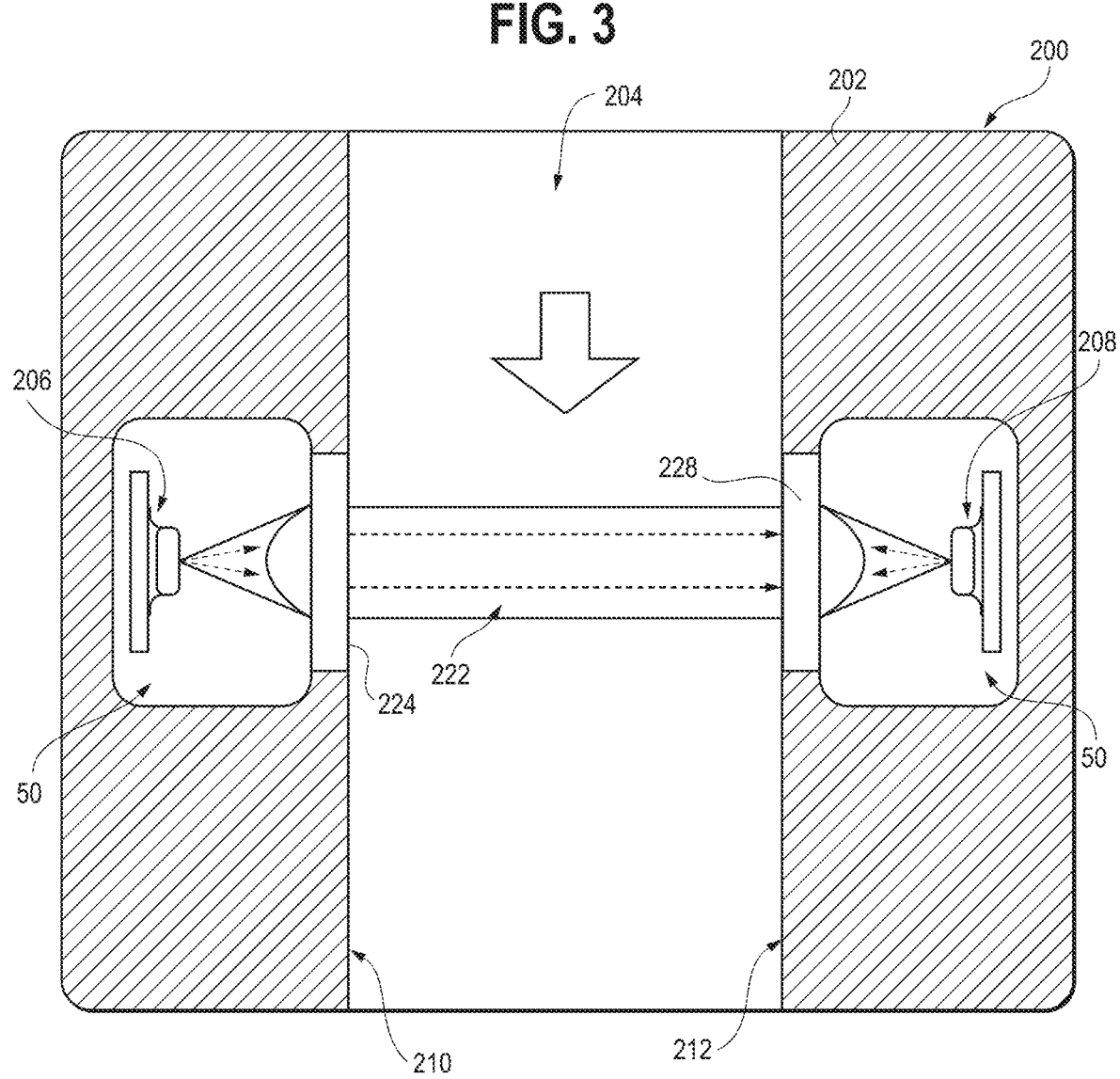
FIG. 3 shows side view of the object detection device according to various embodiments.

FIG. 2 illustrates a top-down view of the object detection device 50 integrated with the passageway conduit (e.g., seed tube 36). FIG. 3 illustrates a side view of the object detection device 50 integrated with the passageway conduit (e.g., seed passageway or seed tube 36). A housing or enclosure 202 is shown, forming the structure of the conduit 200, in which an opening or passageway 204 is formed. The passageway 204 allows objects such as seeds or other material to flow generally downward, for example, from the seed meter 32 toward the soil 27. A cross-sectional shape of the passageway 204 may be rectangular in shape, as shown in FIG. 2, or may have other shapes. Additionally, the cross-sectional shape and/or size of the passageway 204 may change along the length of the conduit 200. In one particular embodiment, the passageway 204, at a location where the object detection device 50 is integrated, is approximately 35 mm by 25 mm, though other sizes are possible.

The object detection device 50 includes a plurality of electromagnetic radiation emitters 206 configured to emit electromagnetic radiation (e.g., light). The object detection device 50 also includes a plurality of radiation detectors 208 configured to receive electromagnetic radiation and output an electrical signal corresponding to an intensity of the received electromagnetic radiation.

In various embodiments, the radiation emitters 206 comprise light emitting diodes (LEDs). In one example, the LEDs are infrared (IR) LEDs that emit light within the infrared frequency spectrum of electromagnetic radiation. However, other types of LEDs are possible, including those that emit visible light or ultraviolet (UV) light. Similarly, the radiation detectors 208 may comprise photodiodes configured to receive electromagnetic radiation in the form of light (e.g., IR, UV, or visible light). In a particular example, the detectors 208 are IR light photodiodes, though other types of photodiodes are possible. Typically, the type of emitter 206 and detector 208 correspond to one another such that if IR LEDs are used for the emitters 206, corresponding IR detectors (e.g. IR photodetectors) are used for the detectors 208.

The terms "electromagnetic radiation" and "radiation" are used interchangeably herein, and may include visible light, specific colors or frequencies ranges of visible light, infrared (IR) light, ultraviolet (UV) light, or other frequency ranges of electromagnetic radiation, alone or in combination. Additionally, the term "light" may be used herein in lieu of the term "electromagnetic radiation." However, the use of the term "light" herein, unless otherwise specified, is not intended to limit the frequency ranges of the electromagnetic radiation utilized in this disclosure to only the frequency spectrums for visible light, infrared light, ultraviolet light, or other frequencies of electromagnetic radiation typically labelled "light." Instead, unless otherwise specified, the current disclosure is usable with frequencies of electromagnetic radiation beyond those typically labelled as "light," even if the term "light" is used herein.

In various approaches, a commensurate number of emitters 206 and detectors 208 are used, and in various embodiments, the numbers are equal. In one embodiment as is shown in FIG. 2, six emitters 206 and six detectors 208 are utilized, however, different numbers of emitters 206 and detectors 208 can be used. In certain embodiments, the emitters 206 and/or the detectors 208 are arranged in a row, and may be in a straight line with equidistant spacing. For example, the emitters 206 may be within, disposed on, or attached to a first sidewall 210 of the conduit 200 forming the passageway 204, while the detectors 208 may be within, disposed on, or attached to a second sidewall 212 of the conduit 200 forming the passageway 204 that is opposite to the first sidewall 210. As such, light emitted from the emitters 206 travels across the passageway 204 to the detectors 208.

The object detection device 50 may also include a plurality of first lenses 214 (emitter lenses) arranged in a row on the first sidewall 210 of the conduit 200 forming passageway 204. A number of the plurality of first lenses 214 may be commensurate in number to a number of the plurality of radiation emitters 206, and may be the same or equal in number.

Figure 4:
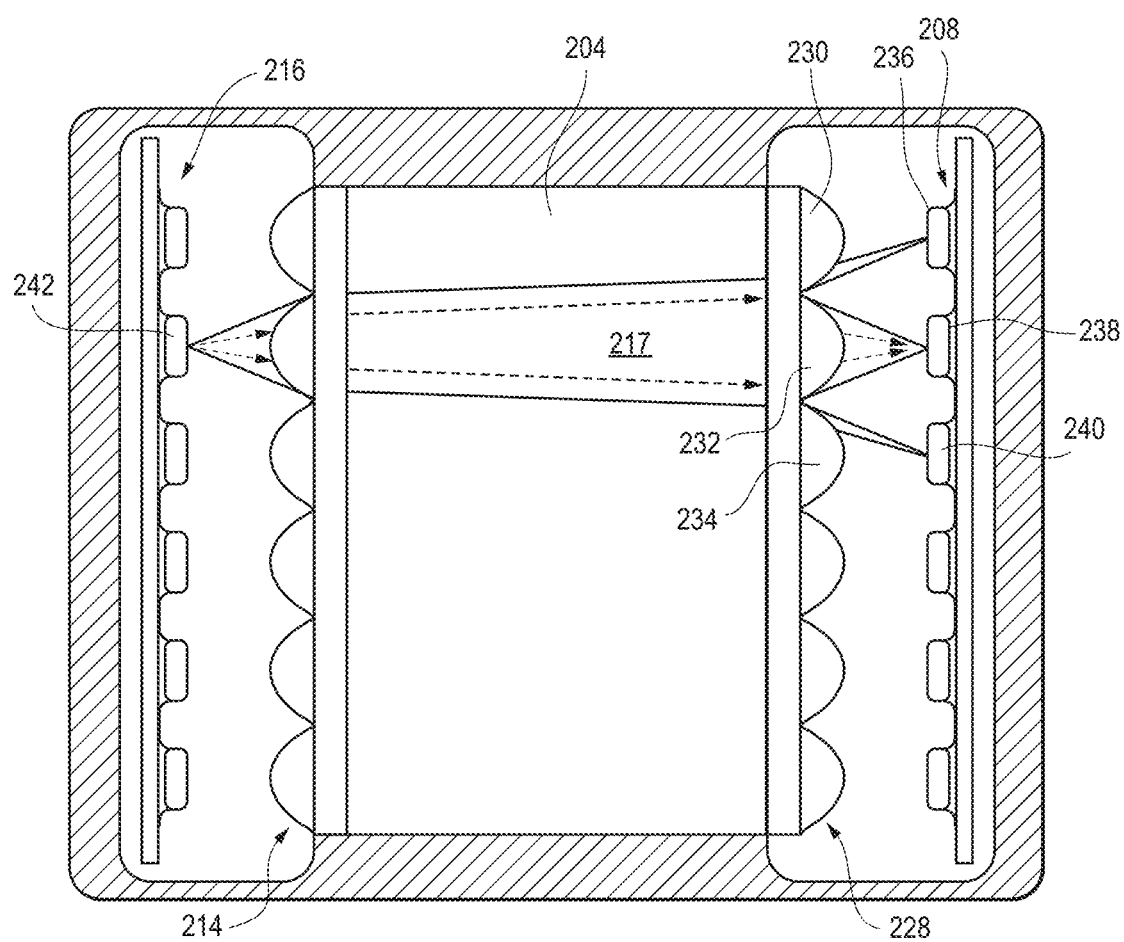
FIG. 4 shows another top-down view of the object detection device according to various embodiments.

Each one of the plurality of first lenses 214 is configured to focus or columnate the electromagnetic radiation (e.g., light) emitted from a corresponding one of the plurality of emitters 206 into a semi-columnated beam of electromagnetic radiation (e.g., light). The individual semi-columnated beams are shown at 216-221 in FIG. 2. A single individual semi-columnated beam 217 is shown in FIG. 4. The semi-columnated beam may refer to electromagnetic radiation that has a substantially columnar, substantially cylindrical, or semi-conical shape. In various approaches, the outer boundary of the shape of the width of the beam may be parallel to or angled slightly outward with respect to the central axis of the ray. Also, in various embodiments, the outer boundary of the shape of the electromagnetic radiation or light can be defined by a location in the cross-section of the beam where the light intensity is half (i.e., −3 Decibels) that of a peak intensity level defined at a central axis of the beam. However, other methods of measuring or defining the shape of the semi-columnated beam are possible.

In various embodiments, each of the plurality of first lenses 214 may have a convex shape, with a convex portion facing toward a respective emitter 206. Similarly, the sides of the first lenses 214 facing the passageway 204 may be relatively flat and may confirm to the shape of the inside of the first sidewall 210 to form a relatively smooth transition between the enclosure and the first lenses 214 to allow seeds and other material to slide downward through the passageway 204 without hindrance. So configured, each of the plurality of first lenses 214 focuses the light emitted from the emitters 206 into the semi-columnated beams of light described above.

When the plurality of first lenses 214 are placed in a row, as shown in FIGS. 2-4, the plurality of first lenses 214 together are configured to create a plane 222 of semi-columnated electromagnetic radiation (e.g. light). In various approaches, the plane 222 may span substantially across a width of the passageway 204 of the conduit 200 so as to avoid dead zones at the edges of the plane 222 in the passageway 204 near the transverse sidewalls of the conduit 200. The plane 222 may be oriented perpendicular to the direction of travel of the objects within the passageway 204.

In various embodiments, a diffusion layer 224 is disposed on a surface of the plurality of first lenses 214 opposite from the plurality of emitters 206. The diffusion layer 224 is configured to diffuse the electromagnetic radiation exiting the plurality of first lenses 214 to aid in generating the plane 222 of semi-columnated electromagnetic radiation. For example, the diffusion layer 224 may slightly diffuse the semi-columnated beams of light to ensure that there are no dead zones between individual beams where no electromagnetic radiation exists so that seeds or other objects cannot slip through those dead zones undetected. The diffusions layer 224 also helps create a more uniform light plane 222 having a more uniform intensity across the cross-section of the light plane 222.

In certain approaches, the plurality of first lenses 214 are configured such that an edge of a first semi-columnated beam of electromagnetic radiation (e.g., 216) focused by a first lens of the plurality of first lenses 214 overlaps with an edge of a second semi-columnated beam (e.g., 217) of electromagnetic radiation focused by a second lens of the plurality of first lenses 214 that is adjacent to the first semi-columnated beam of electromagnetic radiation (e.g., 216). For example, FIG. 2 shows the overlap 226 of the edge of beam 216 with the edge of beam 217. This overlap (e.g., 226) helps reduce dead zones between the beams of the light plane 222 and helps create a more uniform light plane 222 having a more uniform intensity across the cross-section of the light plane 222.

The object detection device 50 may also include a plurality of second lenses 228 (detector lenses) arranged in a row on the second sidewall 212 of the conduit 200 forming the passageway 204 opposite to the first sidewall 210. A number of the plurality of second lenses 228 may be commensurate in number to a number of the plurality of radiation detectors 208 and/or the number of the plurality of first lenses 214, and may be the same or equal in number to either or both. The plurality of second lenses 228 together is arranged to receive the plane 222 of semi-columnated electromagnetic radiation. Each one of the plurality of second lenses 228 is configured to focus a received portion of the plane 222 of semi-columnated electromagnetic radiation onto a corresponding one of the plurality of radiation detectors 208.

In various embodiments, similar to the plurality of first lenses 214, each of the plurality of second lenses 228 may have a convex shape, with a convex portion facing toward a respective detector 208. Similarly, the sides of the second lenses 228 facing the passageway 204 may be relatively flat and may confirm to the shape of the inside of the second sidewall 212 to form a relatively smooth transition between the enclosure 202 and the second lenses 228 to allow seeds and other material to slide downward through the passageway 204 without hindrance. So configured, each of the plurality of second lenses 228 focuses the received portion of the light plane 222 onto a corresponding detector 208.

With reference to FIG. 4, the plurality of second lenses 228 may be configured such a first lens (e.g., 230) of the plurality of second lenses 228 associated with the first semi-columnated beam of electromagnetic radiation (e.g., see FIG. 2, beam 216) also receives a portion of the second semi-columnated beam of electromagnetic radiation (e.g., 217) and focuses the portion of the second semi-columnated beam of electromagnetic radiation (e.g., 217) onto a first radiation detector (e.g., 232) of the plurality of radiation detectors 208 corresponding to the first lens (e.g., 230) of the plurality of second lenses 228. For example, a portion of the beam 217 may be received by the a second lens 232 that is primarily associated with the beam 217, and the second lens 232 may focus that received portion onto a second detector 238 corresponding to the second lens 232. But other portions of the beam 217 may also be received by the first lens 230 and a third lens 234 that are both adjacent to the second lens 232. The first lens 230 may then focus its received portion of the beam 217 onto the corresponding first detector 236, and the third lens 234 may then focus its received portion of the beam 217 onto the corresponding third detector 240. In this manner, a majority of the light plane 222 can be detected by the plurality of detectors 218.

By columnating the electromagnetic radiation into semi-columnated beams 216-221 that together form the plane 222 of electromagnetic radiation, a high light efficiency is achieved wherein a high percentage of the light emitted by the plurality of emitters 206 is directed toward and detected by the plurality of detectors 208. Conversely, previous methods simply broadcast light without first columnating the light. Such systems had a considerably lower light efficiency. With such an improved light efficiency, the plurality of emitters 206 can be operated at a lower power or with a lower current. Further, because the plurality of emitters 206 can be operated with lower power or current due to the high light efficiency, the output intensity of the emitters 206 can be increased as needed in the field without being in danger of reaching a maximum power output of the emitters 206. Such increases in output intensity may be required to account for decreased light transmission caused by blockages or dust within the passageway 204, as is discussed in more detail below.

In alternatively embodiments, additional sets of emitters, detectors, and lenses can be configured to create additional planes of electromagnetic radiation. Such additional planes can be located upstream or downstream along the passageway 204 from the first plane 222. In one approach, a second plane can be created such that the light travels at a 90 degree angle (or another angle) relative to the light of the first plane 222 to detect objects or seeds at a different angle. In various embodiments, emitters and detectors for a second plane could utilize a different frequency of electromagnetic radiation than is utilized for the first plane 222. Other variations are possible, including even more planes, or even a matrix of planes to create a two- or three-dimensional sensing of objects or seeds passing through the passageway 204.

Figure 5:
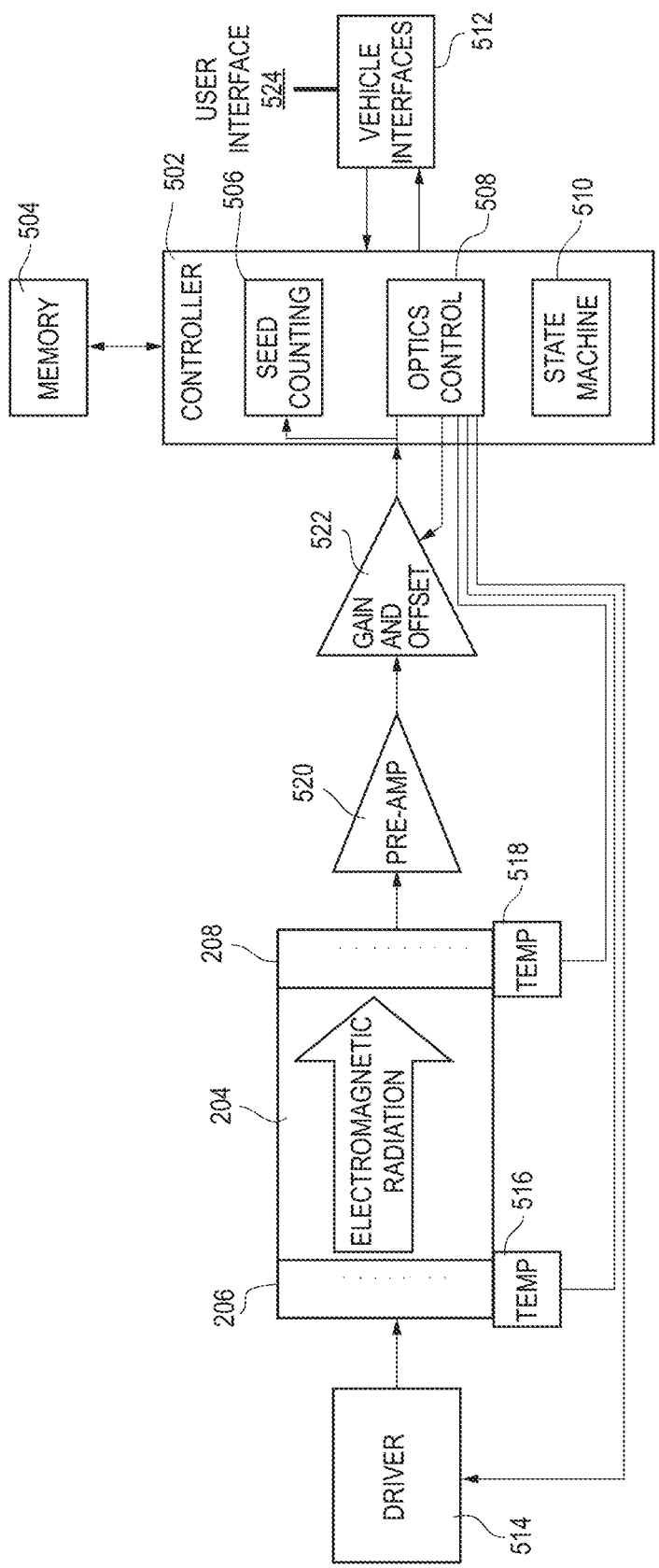
FIG. 5 shows a block diagram of a system architecture of the object detection device according to various embodiments.

FIG. 5 shows a block diagram of a system architecture of the object detection device 500 in accordance with various embodiments. The device 500 may include a controller 502 which may be coupled to or include one or more memories 504. The controller 502 may comprise one or more processing devices coupled to the one or more memories, for example, with a data bus. The processing device may be a Central Processing Unit (CPU), microcontroller, or a microprocessor, and/or may include or be implemented with an Application Specific Integrated Circuit (ASIC), Programmable Logic Device (PLD), or Field Programmable Gate Array (FPGA). The controller 502 may also be implemented with circuitry that includes discrete logic or other circuit components, including analog circuit components, digital circuit components or both. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The memory 504 may comprise a flash memory, a Random Access Memory (RAM), a Read Only Memory (ROM), an Erasable Programmable Read Only Memory (EPROM), a Hard Disk Drive (HDD), other magnetic or optical disk, or another machine-readable nonvolatile medium or other tangible storage mediums other than a transitory signal. The memory 504 may store therein software modules and instructions that, when executed by the processing device of the controller 502, cause the processing device to implement any of the processes described herein or illustrated in the drawings. The memory 504 may also store other data for use by the processing device 502 and/or historical information regarding the operation of the device 500.

The controller 502 may include or implement an object or seed counting/detection algorithm 506 (discussed below). The controller 502 mat also include or implement optics control 508 to control the emitter 206 and detector 208 and associated circuitry. The controller 502 may also include or implement a state machine 510 including rules to interface with the vehicle via the vehicle interfaces 512, and/or to implement overall control over the operations of the controller 502. The controller 502 may communication with the vehicle interfaces 512, for example, via a CAN bus or another wired or wireless communication protocol.

The seeding machine 10 may optionally include a user interface 524 that is also connected to the vehicle interfaces 512, for example, to provide real-time or historical information to a driver about the seed count. The user interface 524 may include a display screen that provides various textual and graphical data representing various information and data relating to the operation or settings of seeding machine 10, including data relating to the seed count, and/or the tractor. The user interface 524 may also comprise audible or sensory outputs that provide the user with audible (e.g., sounds or spoken words) or tactile information (such as seat rumbles or other vibrations). The user interface 524 may also include an input device for receiving commands from the user, such as a touch screen, buttons or switches, voice command, or the like. The user interface 524 can be located within a cab of a tractor to allow the user to receive information and provide commands while operating the tractor. Alternatively, the user interface 524 can be provided via a mobile device in communication with the vehicle interfaces 512, for example, via a wired or wireless interface such as Bluetooth or Wi-Fi.

The device 500 also may include a driver 514, the plurality of electromagnetic radiation emitters 206, the plurality of electromagnetic radiation detectors 208, an emitter temperature sensor 516, a detector temperature sensor 518, a preamp 520, and a gain and offset amplifier 522. An output of the controller 502 is electrically coupled to an input of the driver 514, so that the controller 502 can send signals to the driver 514 to control the operations of the driver 514. An output of the driver 514 is electrically coupled to the plurality of electromagnetic radiation emitters 206. The driver 514 is configured to control and provide power or current to the plurality of electromagnetic radiation emitters 206 to control the intensity of light output by the emitters 206. The driver 514 may include a plurality of outputs, each connected to a different emitter 206, and may be configured to control each of the emitters 206 independently.

The plurality of electromagnetic radiation detectors 208 are configured to receive the electromagnetic radiation emitted from the emitters 206 and to output an electrical signal corresponding to an intensity of the received electromagnetic radiation. In various embodiments, the electrical signal is a current value corresponding to the intensity of the received radiation. The detectors 208 have outputs electrically coupled to one or more preamps 520. Each individual detector 208 may be electrically coupled to a different preamp 520, or may be electrically coupled to the same preamp 520. The one or more preamps 520 receive the output electrical signals (e.g., current) from the detectors 208 and convert the current signal into a corresponding light intensity voltage signal. The preamp 520 may also utilize a scaling factor when converting the current signal to the light intensity voltage signal.

The output of the preamp 520 is optionally electrically coupled to an input of the optional gain and offset amplifier 522. However, the output of the preamp 520 can also be electrically coupled to the controller without the gain and offset amplifier 522. In various embodiments, the controller 502 may include an analog to digital converter (ADC) at its input, which ADC may have input signal requirements. The gain and offset amplifier 522 is configured to amplify and offset, if necessary, the light intensity voltage signal received from the preamp 520 to be within the requirements for the controller's ADC. The output of the gain and offset amplifier 522 (i.e., a radiation intensity signal) is electrically coupled to the input of the controller 502, for example, at the controller's ADC. Optionally, the controller 502 can control the gain and offset amplifier 522 to alter its gain and/or offset based on received signals to optimize the radiation intensity signal output from the gain and offset amplifier 522 for use with the ADC.

Additionally, the device 500 may include an emitter temperature sensor 516 that is configured to sense a temperature associated with the plurality of radiation emitters 206 and output a radiation emitter temperature signal to the controller 502. Similarly, the device 500 may include a detector temperature sensor 518 that is configured to sense a temperature associated with the plurality of radiation detectors 208 and output a radiation detector temperature signal to the controller 502. The temperature sensors 516 and 518 may be thermally connected to the emitters 206 and detectors 208 or may be simply located in close proximity (e.g., with compartments housing the emitters 206 and detectors 208) so as to determine an approximate temperature of the emitters 206 and detectors 208.

The device 500, and the controller 502 in particular, is configured to perform a multitude of operations. In one embodiment, the controller 502 receives the radiation intensity signal corresponding to the intensity of the electromagnetic radiation received by the plurality of radiation detectors 208. The controller 502 may sample the radiation intensity signal output from the gain and offset amplifier 522 corresponding to the intensity of the electromagnetic radiation received by the plurality of radiation detectors 208. The ADC of the controller 502 converts the analog version of the radiation intensity signal into a digital version of the signal, which is then sampled and optionally stored by the controller 502. In various approaches, the controller samples the radiation intensity signal every 50 microseconds (i.e., at 20 kHz), however other sample rates are possible.

In one approach, a single radiation intensity signal that represents all of the combined light intensities detected by the combined set of the detectors 208 is provided to the controller 502.

In an alternative approach, multiple radiation intensity signals that each represent different light intensities detected by different ones of the detectors 208 can be provided to the controller 502. In this approach, the plurality of semi-columnated beams of electromagnetic radiation (e.g., 216-221) from the plurality of first lenses 214 each comprise a separate radiation channel between a corresponding radiation emitter and a corresponding radiation detector. For example, with reference to FIG. 2, the beam 216 would comprise a first radiation channel between the emitter depicted at the upper-most position and the detector depicted at the upper-most position. The controller 502 may then sample a radiation intensity signal corresponding to the intensity of the electromagnetic radiation of each radiation channel as received by the plurality of radiation detectors 208. Each radiation channel and the associated radiation intensity signal is time-varying and can vary from sample to sample. For example, a signal strength (e.g., peak signal strength, mean signal strength, mode signal strength, or median signal strength) and/or a signal phase received at the detectors 208 and/or the controller 502 can be time-varying. In certain approaches, the controller 502 can store in the memory 504 the samples of each of the sampled radiation intensity signals.

After receiving the radiation intensity signal, the controller 502 may determine that a value of the radiation intensity signal is outside of a predetermined range. For example, the controller 502 may determine that the received radiation intensity signal is above or below the bounds of the predetermined range, indicating that the intensity of the light received by the detectors 208 is above or below an acceptable range.

For example, dust, dirt, and/or debris within the passageway 204 and on the lenses 214 and 228 may occlude or otherwise attenuate the transmission of the light from the emitters 206 to the detectors 208. In this situation, the intensity of the light may become lower than an optimal range for detection of the light. Conversely, if dust, dirt, and/or debris that was previously present is no longer within the light transmission path, their attenuating effects may be removed and the intensity of the light may become higher than an optimal range for detection of the light.

In various embodiments, the predetermined range for the radiation intensity signal corresponds to an optimal sensing range of the plurality of radiation detectors 208, the amplifiers 520, 522, or an input of the controller 502 (e.g., the ADC) that receives the radiation intensity signal. For example, if the emitters 206 were simply run at a maximum power (and there are no occlusion effects from dust or debris), the intensity of the light received by the detectors 208 could saturate the output of the detectors 208, could saturate the preamp 520 and/or the gain and offset amplifier 522, and/or could exceed the maximum input value of the ADC of the controller 502. As such, very little usable data would be received by the controller 502 to perform seed counting. This is even more likely to happen due to the high light transmission efficiency created by the columnated radiation beams, discussed above. Also, if the light is too intense, then an amplitude of a change in light intensity due to passing of a seed through the light would be a very small ratio of the overall detected radiation intensity signal. As such, resolution for detecting the seed would be decreased.

Conversely, if the system were merely configured so that the maximum light intensity in an ideal transmission situation (e.g., no dust or dirt) is under the maximum allowable signal, then as soon as any dirt, dust, or debris is within the transmission path, the overall light intensity can become too low such that the amplitude of any change in the light intensity due to a seed would be very small. As such, resolution for detecting the seed is again decreased.

In order to keep the intensity of the electromagnetic radiation (e.g., light) within an optimal sensing range for detecting the seeds passing through, the controller 502 utilized feedback to control the intensity of the electromagnetic radiation by the emitters 206. If the controller 502 determines that the value of the radiation intensity signal is outside of the predetermined range, the controller 502 can adjust an amount of electrical power supplied to the plurality of radiation emitters 206 to at least one of increase or decrease an intensity of electromagnetic radiation emitted by the plurality of radiation emitters 206 so that the value of the radiation intensity signal received by the controller 502 changes to become within the predetermined range. Put another way, if the received radiation intensity signal is too low (e.g., due to dust or dirt), the controller 502 increases the power to the emitters 206 such that the received radiation intensity signal is increased to become within the acceptable range.

In this manner, and combined with the high light transmission efficiency due to the columnated light, the controller can adjust the intensity of the emitters 206 to account for up to 90% blockage of the light transmission while maintaining the received light intensity within the predetermined range (e.g., the optimal range). As such, the controller 502 can operate to detect and count objects or seeds with high accuracy in a very wide range of cleanliness conditions from nearly spotless to very dusty and dirty. Increased accuracy may include a more accurate seed or object count, which may further include the reduction or elimination or false negative or false positive seed detections. Such a solution is particularly advantageous in a seed counting application setting, where the environment is particularly dirty and dusty.

In a similar manner, the controller 502 can also account for electromagnetic radiation transmission efficiency changes caused by temperature variations of the plurality of radiation emitters 206 and/or the plurality of detectors 208. For example, as the plurality of radiation emitters 206 increase in temperature, their output efficiency decreases (e.g., it takes more power to achieve the same light intensity). The controller 502 receives the radiation emitter temperature signal from the emitter temperature sensor 516. The controller 502 can then adjust an amount of electrical power supplied to the plurality of radiation emitters 206 to at least one of increase or decrease an intensity of electromagnetic radiation emitted by the plurality of radiation emitters 206. For example, the controller may utilize an equation or algorithm that equates power to light intensity at different temperatures, or may utilize a lookup table or the like.

Because the passage of seeds through the received light necessarily lowers the intensity of the light, the controller 502 is configured to measure and compare the received radiation intensity signal to the predetermined range at a time when no seeds are passing through the plane of light. Thus, the controller 502 may perform the step of determining that the value of the radiation intensity signal is outside of the predetermined range in response to determining that no moving objects are passing through the plane 222 of semi-columnated electromagnetic radiation. A process to determine that no objects are passing through the plane 222 is discussed in further detail, below. As such, the controller 502 can avoid accidentally increasing the light intensity that would otherwise be caused by misinterpreting a lowered received light intensity due to seed passage through the light plane 222 rather than due to non-seed occlusions (e.g., dirt, dust, and debris).

The controller 502 may adjust the power supplied to the entire group of the plurality of emitters 206 as a whole. Alternatively or additionally, the controller 502 may adjust the power supplied to individual ones of the plurality of emitters 206. In one approach, the controller 502 can perform a diagnostic step when no seeds are passing through the passageway 204 to determine the light intensity received from each individual emitter 206. With reference to FIG. 4, the controller 502 may control operation of a one individual radiation emitter (e.g., 242) of the plurality of radiation emitters 206 to emit electromagnetic radiation (e.g., beam 217) while at the same time controlling operation of a remainder of the plurality of radiation emitters 206 to not emit electromagnetic radiation. The controller 502 may then receive a radiation intensity signal (e.g., a second radiation intensity signal) corresponding to an intensity of radiation received by at least one individual radiation detector (e.g., 238) of the plurality of radiation detectors 208 corresponding to the one individual radiation emitter (e.g., 242). For example, as discussed above, the radiation intensity signal may be received from all of the plurality of detectors 208, wherein the majority of the signal is created by the one detector 238 as the light from the one emitter 242 is focused primarily on the one detector 238. Alternatively, the detectors other than the one detector 238 can be deactivated by the controller 502 such that they do not generate radiation intensity signals that are combined with signals from the one detector 238. Alternatively still, the radiation intensity signal may be generated and received individually from the one detector 238 in an instance where each of the plurality of detectors 208 each provide their own radiation intensity signals to the controller 502.

The controller 502 may determine that a value of the radiation intensity signal corresponding to that single beam (e.g., 217) and emitter (e.g., 242) is outside of a predetermined range. In response, the controller 502 can then adjust an amount of electrical power supplied to the one radiation emitter (e.g., 242) to at least one of increase or decrease an intensity of electromagnetic radiation emitted by the one radiation emitter (e.g., 242) so that the value of the radiation intensity signal changes to become within the predetermined range. This predetermined range for the radiation intensity signal for individual beams may be lower than the predetermined range for the entirety of plane 222 as sensed by all of the detectors 208.

Similarly, the controller 502 can control operation of the remainder of the plurality of radiation emitters 206 to emit electromagnetic radiation one at a time during different time segments. The controller 502 can receive radiation intensity signals corresponding to intensities of electromagnetic radiation received by the remainder of the plurality of radiation detectors 208, either collectively or one at a time. As discussed above, each individual radiation detector of the remainder of the plurality of radiation detectors 208 corresponds to an individual radiation emitter of the remainder of the plurality of radiation emitters 206, which receives the electromagnetic radiation during the different time segments. The controller 502 may determine for each individual radiation emitter 206 whether a value of the radiation intensity signal is outside of the predetermined range. The controller 502 may then responsively adjust the amount of electrical power supplied to the individual radiation emitters to at least one of increase or decrease an intensity of electromagnetic radiation emitted by the individual radiation emitters so that the value of the radiation intensity signal changes to become within the predetermined range.

In this manner, the controller 502 can fine tune the illumination intensity for each individual emitter 206 to account for different light transmission attenuation factors across the plane 222. For example, one lens of the plurality of first lenses 214 or of the plurality of second lenses 228 may have more dirt or dust on it than another lens, and the controller 502 may account for the specific light transmission attenuation for that associated beam by increasing the intensity of light output by that corresponding emitter.

According to the above description, the controller 502 can compensate for occlusion of the plane 222 of semi-columnated electromagnetic radiation caused by build-up of dust and seed particles on at least one of the plurality of first lenses 214 or the plurality of second lenses 228 by adjusting the amount of the electrical power supplied to the plurality of radiation emitters.

In other embodiments, the controller can also account for noise within the received and sampled radiation intensity signal. Such noise may be caused by a plurality of factors, including, for example, voltage drift of various circuit components (e.g., amplifiers 520 and 522), electronic noise, varying biasing voltages. However, a major source of noise within the intensity signal is caused by dust and debris present in and moving through the plane 222 of electromagnetic radiation that temporarily and dynamically occludes the plane 222. Particularly, in the dusty environment in which seeding machines are used, dust can play a major role in dynamically increasing a noise floor of the intensity signal received and processed by the controller 502. This increased noise floor can, in certain approaches, trigger false seed detection events, negatively affect the resolution of the signal, and can otherwise decrease the accuracy of the seed counting algorithm.

Figure 6:
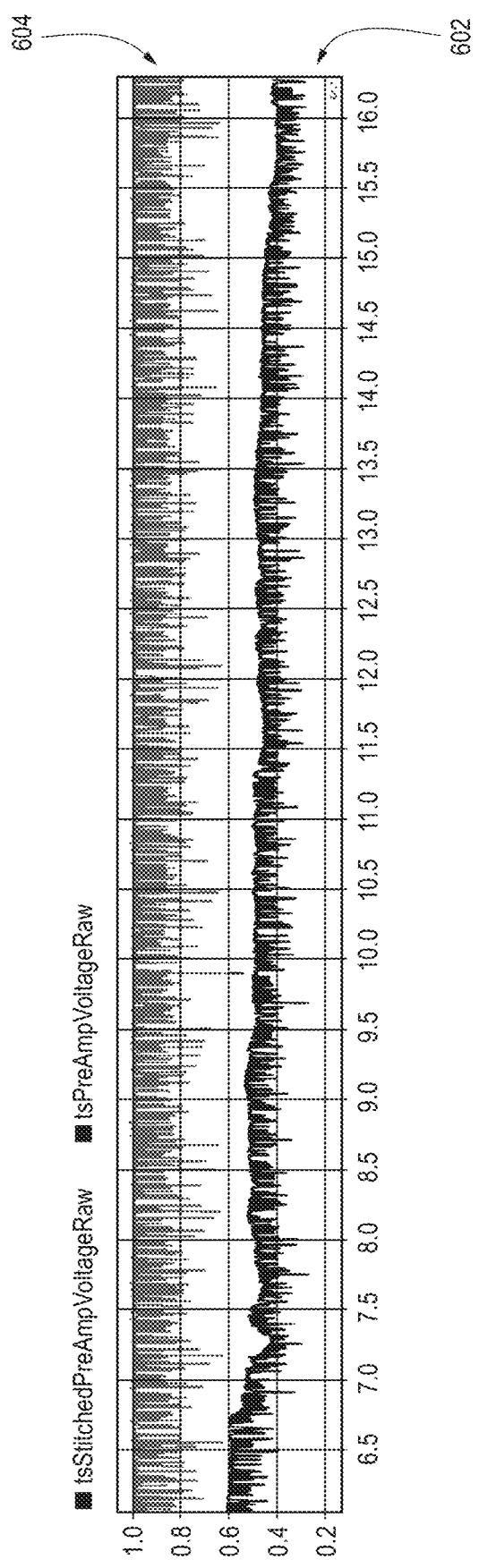
FIG. 6 shows an example signal diagram according to various embodiments.

FIG. 6 shows an example signal diagram with two superimposed signals. The bottom signal 602 shows the radiation intensity signal received and sampled by the controller 502. As is shown, the drift of the signal, which is primarily caused by dust within the passageway 204, is significant. Accordingly, a single threshold cannot be selected with which to detect pulses within the signal. For example, if a threshold was set at a higher value in order to detect the negative pulses on the left side of the signal diagram, when the noise causes the signal strength to drift downward as shown on the right side of the signal diagram, many false positives and/or a continuous positive signal may occur. Alternatively, if the threshold was set at a lower value in order to detect the negative pulses on the right side of the signal diagram, the controller 502 may not detect the negative pulses on the left side of the signal diagram because the pulses do not drop low enough. Conversely, the top signal 604 shows a signal that has been scaled (e.g., at 1V) to account for the changing base noise floor within the signal such that a he threshold can be selected and utilized to detect the pulses across different base noise floors.

Figure 7:
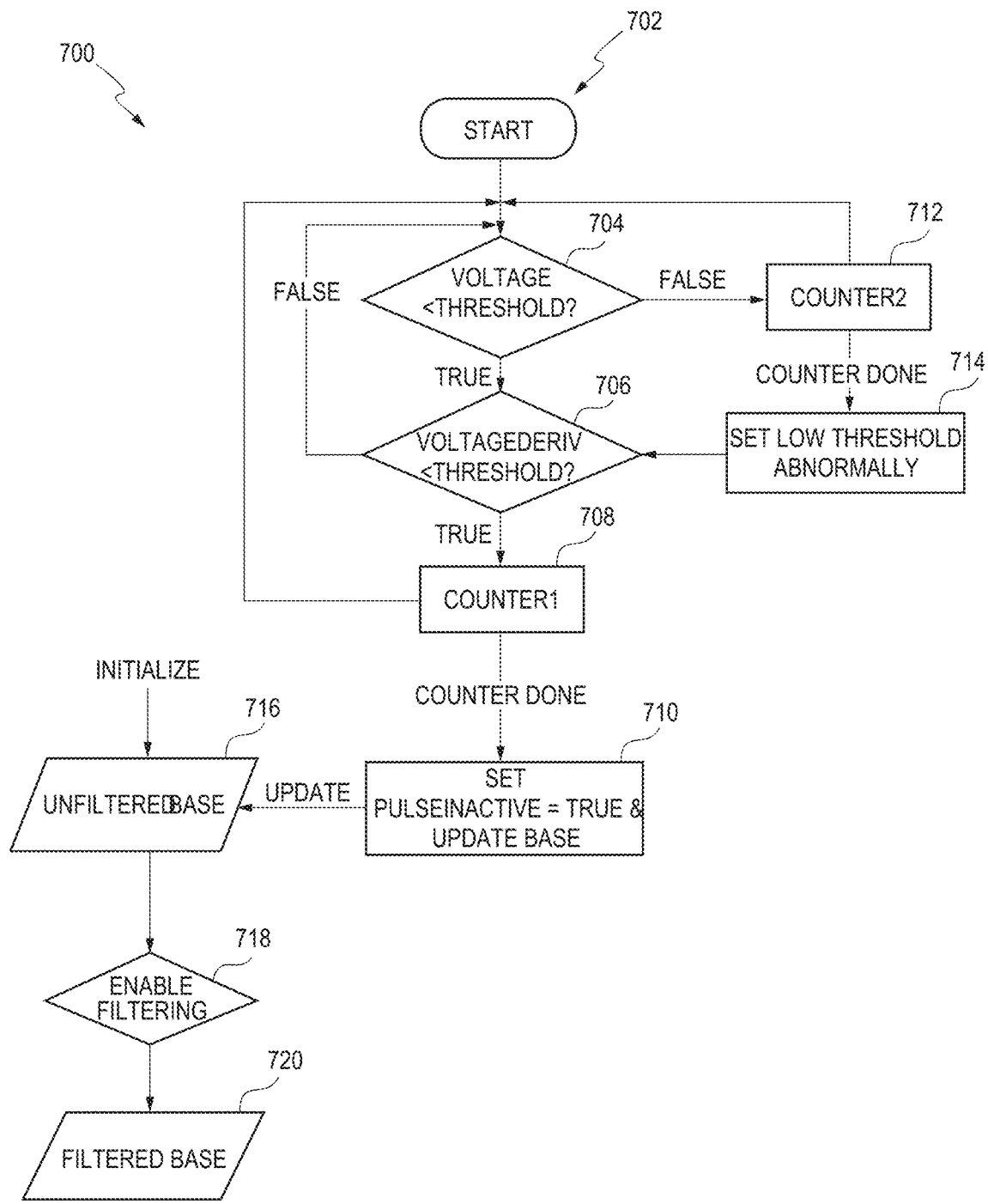
FIG. 7 shows flow diagram of a method performed by the object detection device according to various embodiments.

FIG. 7 illustrates a flow diagram of a method performed by the object (e.g., seed) detection device 500, and in particular the controller 502, for adjusting a radiation intensity signal to account for the level of noise in the signal to improve the object counting accuracy in accordance with various approaches. The method achieves this by updating a base noise floor value to be equal to a current value of the received radiation intensity signal only when certain conditions are met.

As discussed above, the controller 502 is coupled to the plurality electromagnetic radiation detectors 208 and receives the radiation intensity signal corresponding to an intensity of electromagnetic radiation received by the plurality of radiation detectors 208. At 704, the controller 502 may then determine that a value of the radiation intensity signal is within a voltage threshold. This indicates that no seed is passing through the plane 222 of electromagnetic radiation received by the plurality of radiation detectors 208 at that time. In certain approaches, the voltage threshold is dynamic and includes a voltage offset added to the current value of the base noise floor (determined during a previous iteration of the method 700). As such, the voltage threshold may account for the currently set base noise floor so that only signal changes caused by seeds passing through the plane 222, rather than changes due to the noise itself (e.g., the dust), will be outside of the voltage threshold.

If the value of the signal is within the voltage threshold, then, at 706, the controller 502 may determine a derivative of the radiation intensity signal to determine a slope of a change in the signal. The controller 502 may utilize the current and historical samples of the intensity signal to calculate the derivative of the signal over time in a known manner. Also at 706, the controller 502 determines that the derivative of the radiation intensity signal is less than a derivative threshold level. If so, then, at 708, the controller updates a counter that keeps track of how long the derivative of the radiation intensity signal is less than the derivative threshold level. The method will then repeat itself with a next sample of the incoming radiation intensity signal.

When the derivative of the radiation intensity signal exceeds the derivative threshold level, it is an indicator that a seed may be passing through the light plane 222. Because seed events usually have a sharp onramp profile, the derivative is used to detect this transition to determine whether seeds are passing through the light plane 222. Thus, the converse is true, such that when the derivative of the radiation intensity signal does not exceed the derivative threshold level, it is a strong indicator that no seed is passing through the light plane 222. By comparing the signal and its derivative to the voltage threshold and the derivative threshold levels, respectively, a high confidence can be achieved that no seeds are presently passing through the light plane 222, which is the proper time to during which to adjust the base noise floor value.

After at least a predefined time (set by the counter at 708) elapses (e.g., a predetermined number of incoming samples are received), during which time the derivative of the radiation intensity signal is less than the derivative threshold level and during which the value of the signal is within the voltage threshold, the controller 502 will then at 710 responsively update a base noise floor value to be the current value of the radiation intensity signal. This updated base noise floor value accounts for particles within the path of the plane 222 of electromagnetic radiation received by the plurality of radiation detectors to improve an accuracy of an object counting system. However, as discussed above, updating the base noise floor is only performed upon determining that no seed is present in the light plane 222 for at least a predetermined amount of time as set by the counter at 708. Otherwise, the base noise floor could be updated during times in which seeds influence the noise floor, which would not properly reflect the noise caused by dust and other factors besides the actual seeds. When the base noise floor value is updated, the counters are cleared and the method 700 repeats itself for the next sample.

In certain embodiments, situations can occur where the noise caused by the dust can change drastically such that the received intensity signal is outside of the range of the voltage threshold, which voltage threshold would otherwise indicate the presence of a seed. However, the method 700 can distinguish between such drastic changes caused by seeds and those caused by noise (e.g., dust or debris).

As stated above, the controller 502 can receive the radiation intensity signals from the detectors 208. In a certain example, these received intensity signals may be received at a subsequent time from the intensity signals discussed above. At 704, the controller 502 determines that a value of this subsequent radiation intensity signal is outside of the voltage threshold and the controller 502 updates a second counter at 712 that keeps track of how long the values of these subsequent radiation intensity signal samples are outside of the voltage threshold. The method will then repeat itself with a next sample of the incoming radiation intensity signal.

After a predetermined elapsed abnormality time (set by the second counter at 712) elapses, during which time the value of the subsequent radiation intensity signal was outside of the voltage threshold, the controller 502 will determine at 714 that the signal has been outside of the voltage threshold for an abnormally long time. As such, the controller 502 will then move to the second stage of the seed detection process to determine, at 706 and 708, that the derivative of the intensity signal is less than the derivative threshold level for at least the predefined elapsed time. If the predetermined elapsed time at 708 elapses, indicating that the slope of the signal has been low for a while, then there is a high confidence that no seed is currently passing through the light plane 222. As such, it can be determined that the fact that the radiation intensity signal is outside of the voltage threshold is caused by a change in the noise and not by a seed. Accordingly, at 710, the controller 502 will then responsively update the base noise floor value to be the current value of the radiation intensity signal.

Figure 8:
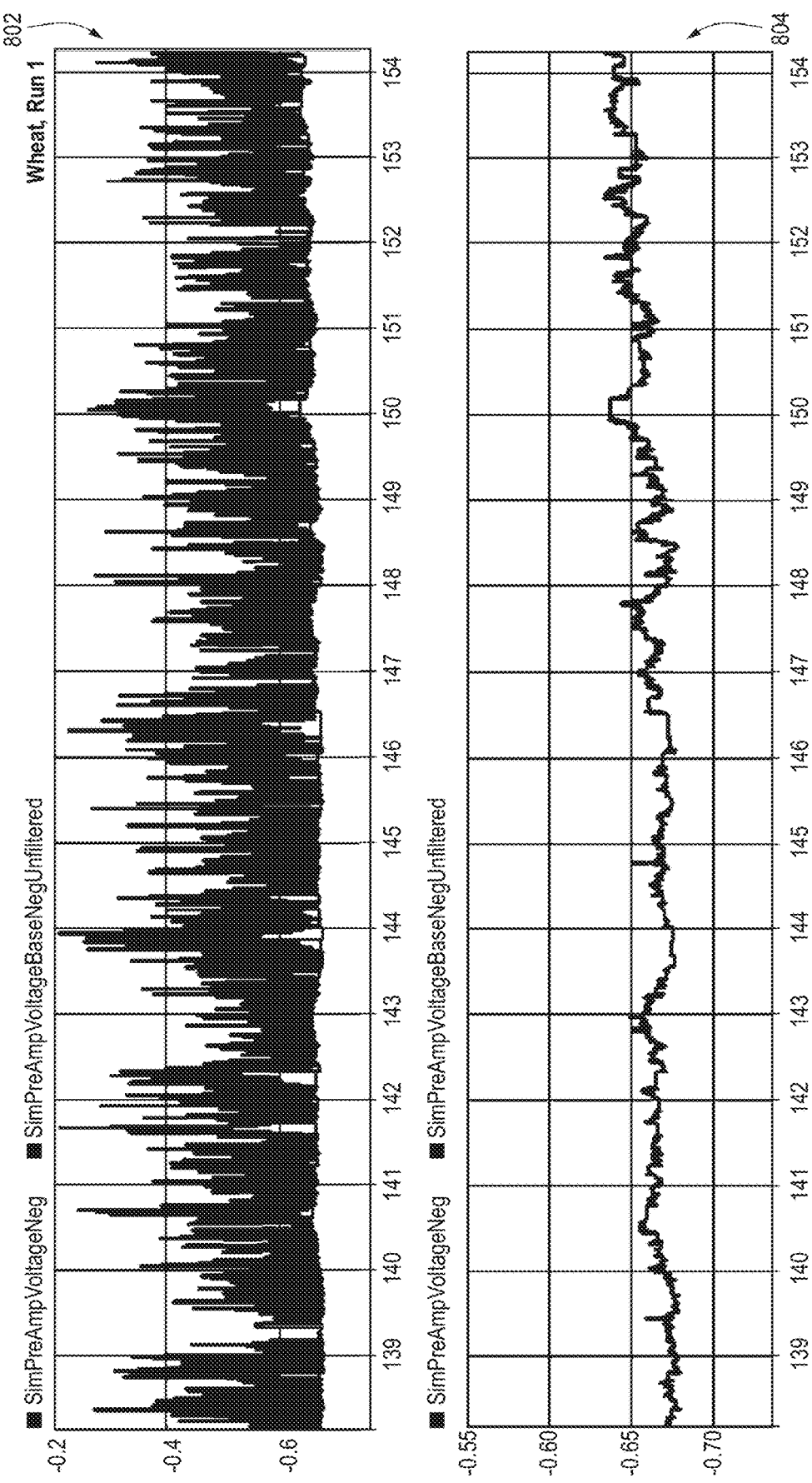
FIG. 8 shows a signal diagram with an example received radiation intensity signal according to various embodiments.

FIG. 8 shows a signal diagram with an example received radiation intensity signal 802 (shown inverted, where the upward pulses indicate a reduction in received light intensity due to seeds passing), and a resulting signal corresponding to the base noise floor values 804 as updated by the controller 502 in accordance with the method 700. In one embodiment, the base noise floor values 804 represents an unfiltered version of the base noise floor values.

Returning to FIG. 7, the unfiltered updated base noise floor values are captured and saved at 716 by the controller 502 to create the base noise floor signal, as illustrated at 804 in FIG. 8. In one approach, at 718, the controller 502 can filter the unfiltered base noise floor values or signal using a low pass filter. This low pass filter can be implemented by utilizing a historical comparison of the current unfiltered base noise floor value to at least one previous filtered base noise floor value to generate an updated filtered base noise floor value or signal at 720. Other known methods of implementing a low pass filter on the unfiltered base noise floor signal can be implemented as well.

Once the controller 502 has the updated base noise floor signal, the controller 502 can then scale the radiation intensity signal according to the base noise floor value to generate a scaled radiation intensity signal. Alternatively, if filtering is utilized at 718, the controller 502 can scale the radiation intensity signal according to the updated filtered base noise floor value to generate the scaled radiation intensity signal. In certain embodiments, the controller 502 scales the radiation intensity signal according to the base noise floor value (or the updated filtered base noise floor value) by dividing the radiation intensity signal by the base noise floor value (or the updated filtered base noise floor value) to generate the scaled radiation intensity signal.

For example, if the radiation intensity signal can be a maximum of 1v (at highest received intensity) and 0V (at a lowest received intensity), and if a particular radiation intensity signal sample value at a particular time is 0.4V, and a particular base noise floor value at that same time is 0.8V, then the radiation intensity signal sample value (0.4V) is divided by the base noise floor value (0.8V) to be a scaled radiation intensity signal value of 0.5V (0.4/0.8=0.5). As mentioned above, FIG. 6 shows a signal 604 that has been scaled (e.g., at 1V) according to the base noise floor values.

Utilizing such a scaled radiation intensity signal allows for greater accuracy in seed detection, for example, by removing the effects of the noise caused by the dust, which noise may otherwise create false positive or false negative seed detection events and can interfere with or distort the changes in the received intensity signal that are truly attributable to a seed event.

As mentioned above, the controller 502 is also configured to count the objects or seeds passing through the plane 222 of electromagnetic radiation. The controller 502 may process the received radiation intensity signal, or may process the scaled radiation intensity signal discussed above in coordination with various seed detection algorithms. In certain approaches, the controller 502 can output a count of the number of objects or seeds that pass through the plane 222 of semi-columnated electromagnetic radiation. This output can be provided, for example, to the vehicle interfaces 512, which may in turn be provided to the user interface 524. A seed count can then be provided to a user of the vehicle via the user interface 524, for example via one or more displays or other interfaces of the vehicle. Alternatively, the seed count output can be used by the vehicle to automatically adjust operations of the seeding machine 10 such as, for example, changing operation of the seed meter 32 to alter its speed to match a target rate at which the seeds are output.

In certain approaches, the controller 502 can receive a selection of a type of seed that is passing through the passageway conduit. For example, a user of the vehicle may select a seed type that will be planted via an interface, which selection can be communicated to the controller 502 via the vehicle interfaces 512. Example seed types include soybean, wheat, canola, oat, barley, and rice. Additionally, in another example, a user may select a seed delivery type, which may be singulation or volumetric. The controller 502 can also receive the seed delivery type via the vehicle interfaces 512. In accordance with these selections, the controller 502 can responsively select a processing algorithm to implement during the processing of the radiation intensity signals. In one example, the controller 502 use a pulse arbitration algorithm if the seed type is soybean. However, if the seed type is wheat or canola, and the delivery type is singulation, the controller 502 may use a duty cycle algorithm. But, if the seed type is wheat or canola, and the delivery type is volumetric, the controller 502 may use an enhanced duty cycle algorithm. These three algorithms are discussed below.

Figure 9:
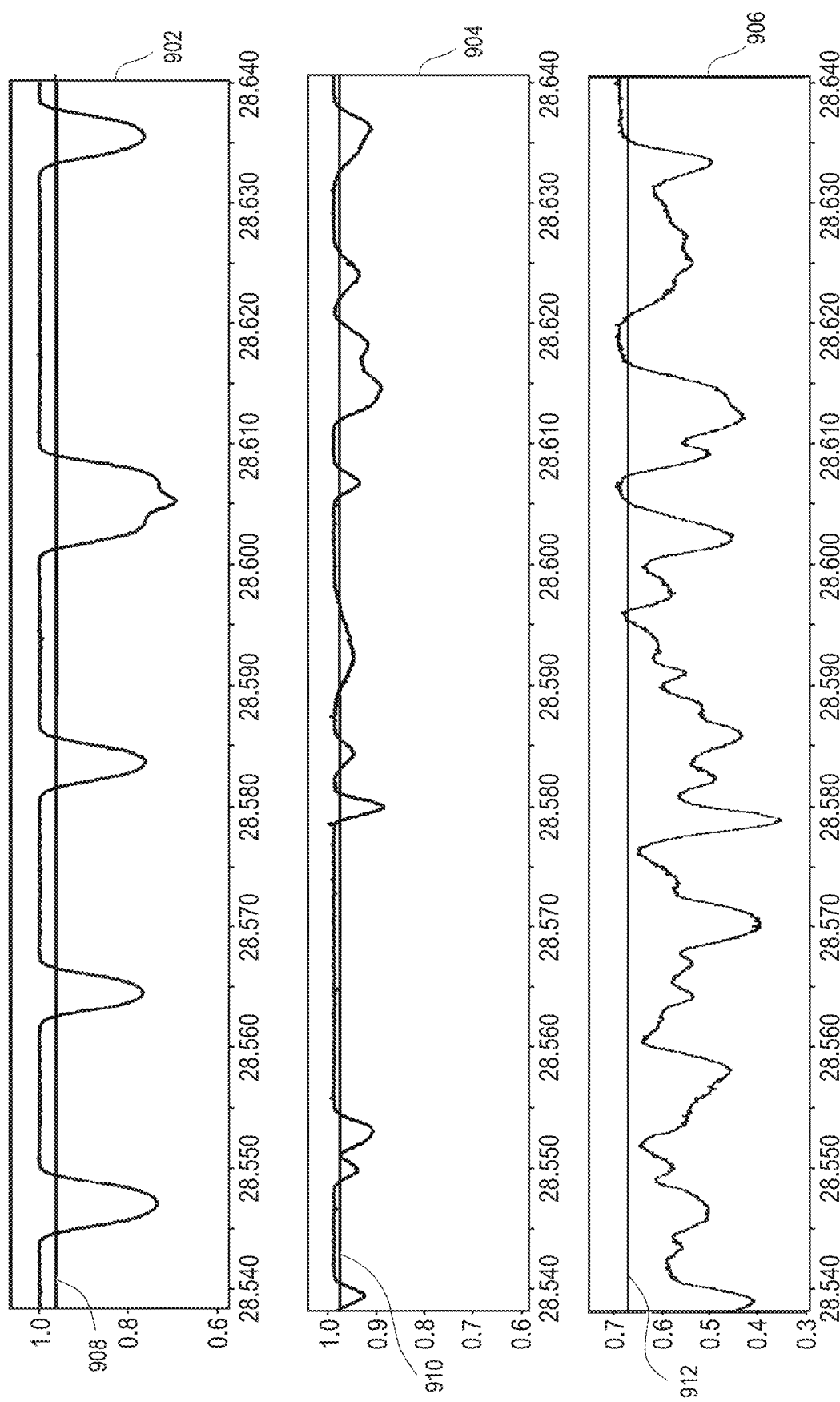
FIG. 9 shows different example radiation intensity signals received for different seed types according to various embodiments.

FIG. 9 illustrates different example radiation intensity signals received for different seed types. Signal 902 shows an example radiation intensity signal received when detecting soybean seeds. Signal 904 shows an example radiation intensity signal received when detecting canola seeds. Signal 906 shows an example radiation intensity signal received when detecting wheat seeds. As can be seen, each of these different seed types provides different signal characteristics and are processed according to the different algorithms.

One common aspect of the different algorithms is that no seed is detected unless the controller 502 detects a pulse in the scaled radiation intensity signal that exceeds a first pulse detection threshold. A pulse duration may be the time the signal is outside of or exceeds the first pulse detection threshold. For example, with reference to FIG. 9, the individual pulses of the signal 902 each may be outside of or exceed (e.g., the inverse of the pulse is higher than the threshold level) the first pulse detection threshold 908 for well-defined periods of time. Similarly, different portions of the signals 904 and 906 may be outside of or exceed the first pulse detection thresholds 910 and 912. The controller 502 can then responsively determine that at least one seed passed through the electromagnetic radiation received by the plurality of radiation detectors during the pulse. One issue is then to determine how many seeds are included within each pulse.

In one approach, the controller 502 implements a pulse arbitration algorithm to count the individual seeds. The inventors have discovered that the number of peaks and/or troughs present in a derivative of the radiation intensity signal is a fairly accurate way to detect multiple seeds within a single pulse. The controller 502 determines a derivative of the pulse in the scaled radiation intensity signal. The controller 502 then counts a number of peaks and troughs in the derivative of the pulse. In one approach, the peaks must be a positive slope value in order to be counted and cannot be a peak in the derivative signal that is still negative. Similarly, the troughs must be a negative slope value in order to be counted and cannot be a trough in the derivative signal that is still positive. In one example, the controller 502 takes the higher of the number of peaks and troughs as the number of seeds that were present in the pulse. For example, the controller 502 may determine that at least two peaks or at least two troughs exist in the derivative of the pulse and responsively determine that two seeds passed through the electromagnetic radiation during the pulse.

Figure 10:
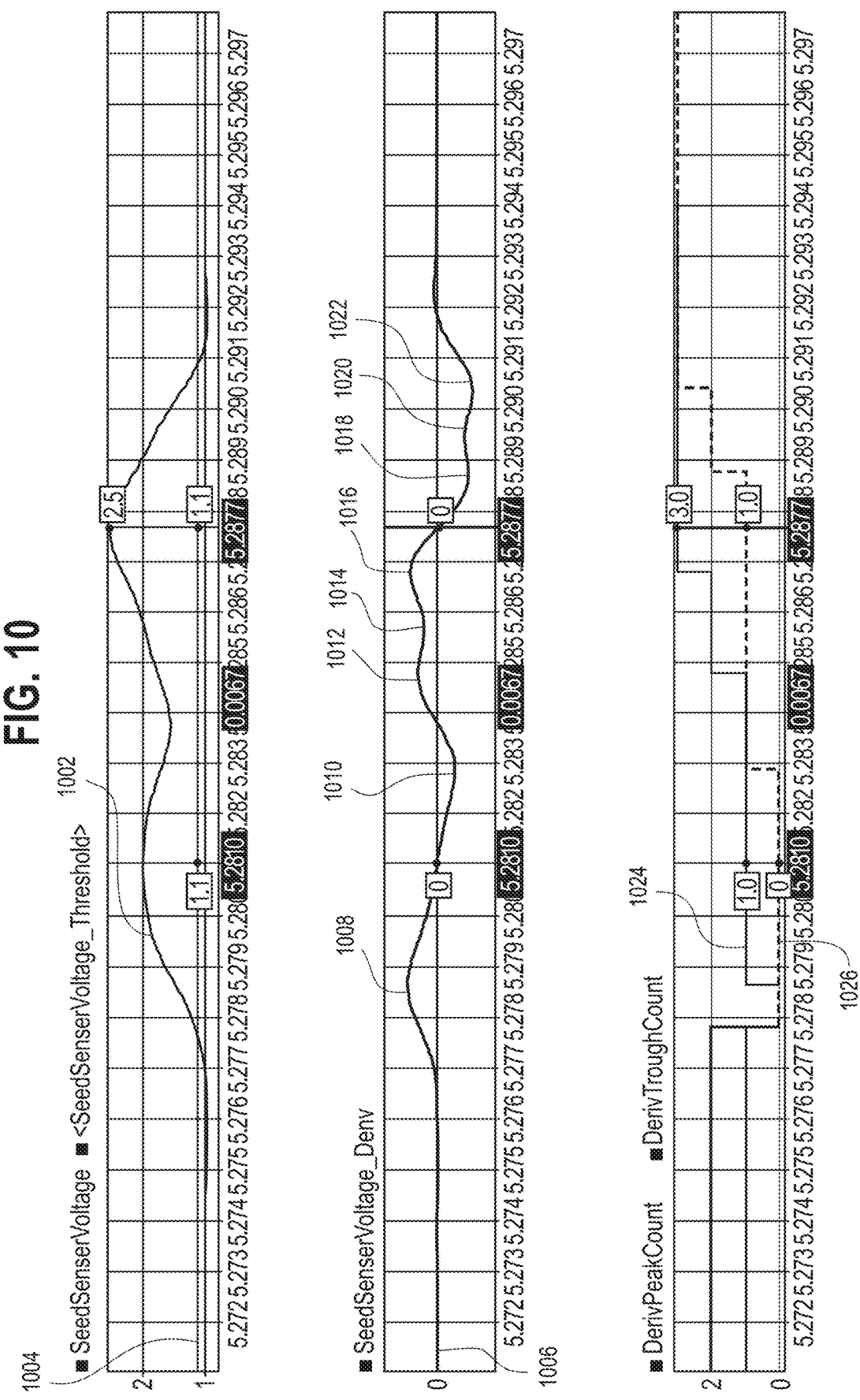
FIG. 10 shows a set of signal diagrams, including a scaled radiation intensity signal according to various embodiments.

FIG. 10 shows a set of signal diagrams, including a scaled radiation intensity signal 1002 showing a pulse that exceeds the first pulse detection threshold 1004. Signal 1006 shows a derivative of the signal 1002. The derivative signal 1006 includes a first peak at 1008, a first trough at 1010, a second peak at 1012, a second trough at 1014, a third peak at 1016, and third trough at 1018, a fourth peak at 1020, and a fourth trough at 1022. As is shown by signal 1024, which is a count of the number of detected peaks, and signal 1026, which is a count of the number of detected troughs, the controller 502 can count each of the peaks and troughs. Signal 1024 increments by one count each at the first peak 1008, the second peak 1012, and the third peak 1016. However, it does not increment at the fourth peak 1020 because the value is still negative. Similarly, signal 1026 increments by one count each at the first trough 1010, the third trough 1018, and the fourth trough 1022. However, it does not increment at the second trough 1014 because the value is still positive. Thus, both the total peak and trough count are both three. As such, the controller 502 can determine with a high level of confidence that the pulse included three seeds. However, in certain embodiments, if the counted number of peaks was three while the counted number of troughs was only two (or vice versa), the controller 502 can use the higher of the count between the number of peaks and the number of troughs as the seed count in the pulse.

In various approaches, certain aspects of the pulse in the radiation intensity signal (rather than derivative signal) can be used to determine a number of seeds that pass. For example, the controller 502 can determine that a height of the pulse exceeds a second pulse detection threshold greater than the first pulse detection threshold, and responsively determine that at least two seeds passed through the electromagnetic radiation during the pulse. In this situation, the very high amplitude of the pulse indicates that at least two seeds were present during the pulse. Similarly, the controller 502 may determine that a width of the pulse exceeds a pulse width detection threshold, and responsively determine that at least two seeds passed through the electromagnetic radiation during the pulse. In this situation, the longer duration of the pulse indicates that at least two seeds were present during the pulse.

Figure 11:
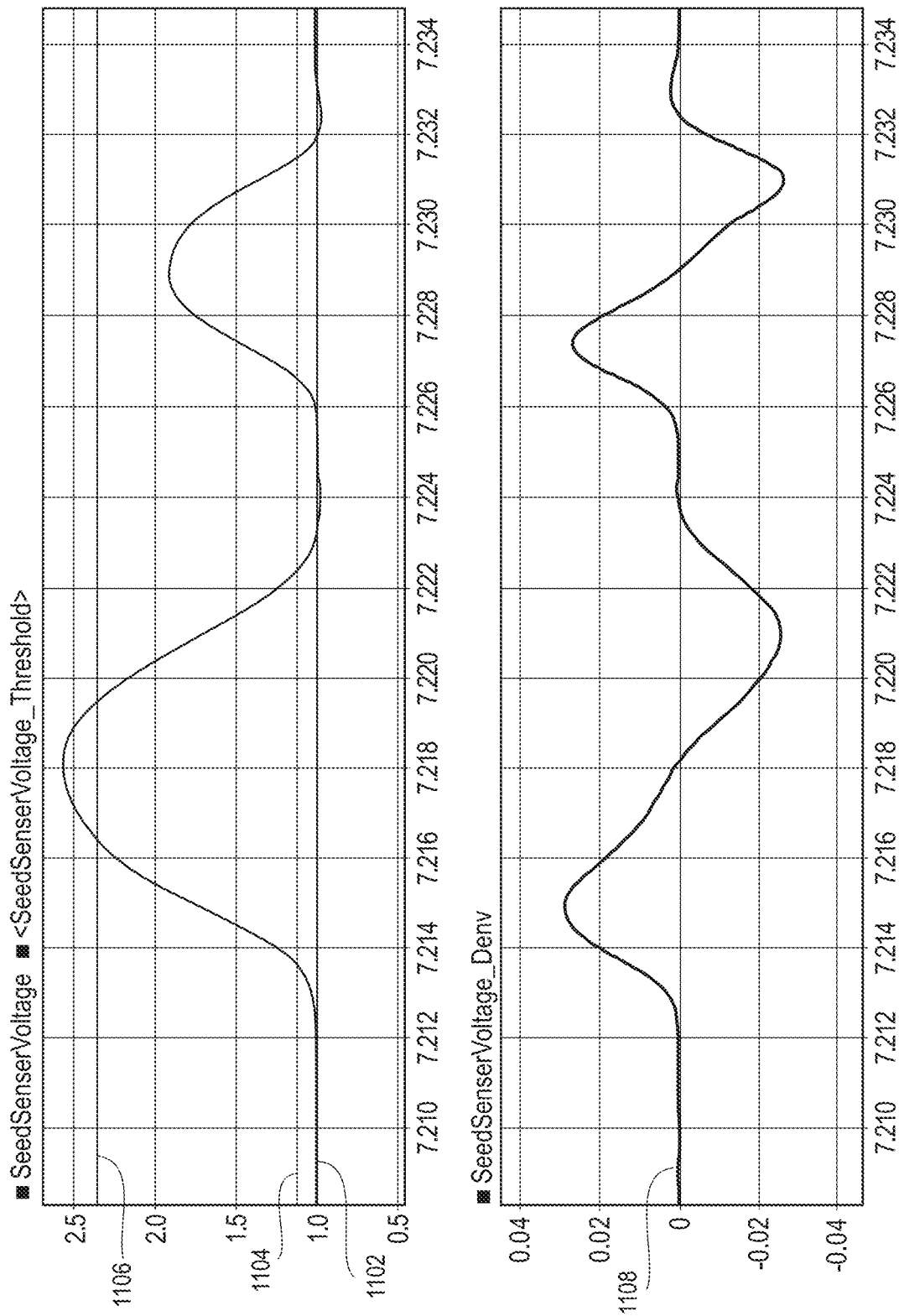
FIG. 11 shows another example radiation intensity signal according to various embodiments.

For example, with reference to FIG. 11, a radiation intensity signal 1102 shows a large pulse that exceeds both the first pulse detection threshold level 1104 and the second pulse detection threshold 1106 greater than the first 1104 to indicate that at least two seeds were present in the pulse. Similarly, the large pulse has a width or duration that may exceed a pulse width detection threshold to indicate that at least two seeds were present in the pulse. It is noted that although in this particular example, the derivative signal 1108 only shows one peak and one pulse (resulting in a count of one seed), the controller 502 can rely on the height and/or the width or duration of the pulse to make a determination that at least two seeds were present during the pulse.

In situations where high seed rates are utilized, and particularly with smaller seeds, the above described pulse arbitration algorithm can become unreliable. Instead, a population count type of algorithm (such as a duty cycle or an enhanced duty cycle algorithm) can be utilized to estimate the number of seeds based on various factors.

In various approaches, the controller 502 implements a duty cycle algorithm. The controller 502 can detect a plurality of pulses in the scaled radiation intensity signal exceeding the first pulse detection threshold. The plurality of pulses each correspond to a plurality of seeds passing through the electromagnetic radiation. The controller 502 can determine an average pulse duty cycle of the plurality of pulses. There are at least two ways to calculate average pulse duty cycle. One method is to average pulse duty directly. The other method is to use average pulse on duration and pulse spacing for a calculation using the following equation:

$$AvgPulseDuty = AvgPulseOnDuration / AvgPulseSpacing$$

Using the calculated average pulse duty cycle, the controller 502 can estimate a number of seeds that pass through the electromagnetic radiation during each pulse of the plurality of pulses. In one approach, the controller 502 may estimate the number of seeds per pulse using the following equation:

$$SeedsPerPulse(AvgPulseDuty) = c0 + c1 * AvgPulseDuty + c2 * AvgPulseDuty^2$$

Figure 12:
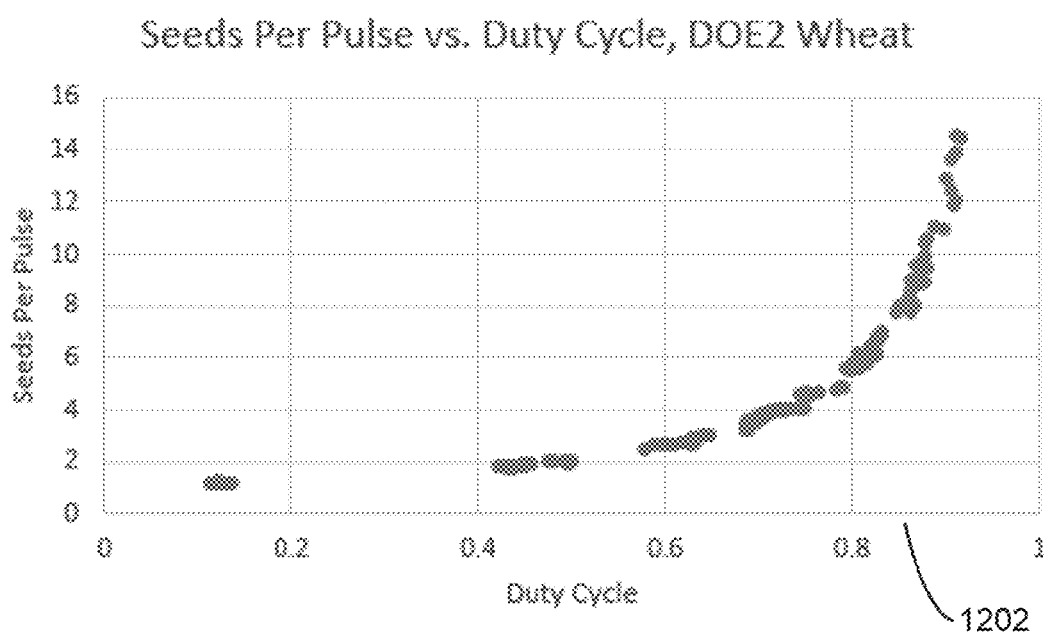
FIG. 12 shows an example of a curve of an average duty cycle and the seeds per pulse according to various embodiments.

Coefficients c0, c1 and c2 are calibrated using test data at development time, and may be calibrated for different seed types and/or seed sizes. In various embodiments, due to a nonlinearity of the curve, the curve may be divided up to different sections, with each section having a different equation fit. FIG. 12 shows an example of a curve of the average duty cycle and the seeds per pulse for wheat seeds. The above equation is adjusted to fit such an example curve, and is thereafter utilized by the controller 502. Alternatively, different lookup tables may be created for different seed types based on the calibrated equation and curve (e.g., like the curve of FIG. 12), and the controller may simply utilize an appropriate lookup table corresponding to a selected seed type to determine a number of seeds per pulse based on the average duty cycle.

In various approaches, the controller 502 implements an enhanced duty cycle algorithm. For test performed with volumetric delivery, it was found the duty cycle curve can become less accurate. With careful examination of data, the inventors discovered that incorporate pulse width as a second independent variable in a nonlinear regression curve fit turned out to effectively improve accuracy with volumetric delivery. Accordingly, the controller 502 may determine an average pulse width for the plurality of pulses within the scaled radiation intensity signal that exceed the first pulse detection threshold. The pulse width is the distance between the start of consecutive pulses. The controller 502 can then estimate, based on the average pulse duty cycle and the average pulse width, the number of seeds that pass through the electromagnetic radiation during each pulse of the plurality of pulses. In various approaches, the controller 502 may estimate the number of seeds per pulse using the following equation:

$$SeedsPerPulse(AvgPulseDuty, AvgPulseWidth) = p00 + p10 * AgPulseDuty + p01 * AvgPulseWidth + p20 * AvgPulseDuty^2 + p11 * AvgPulseDuty * AvgPulseWidth$$

Figure 13:
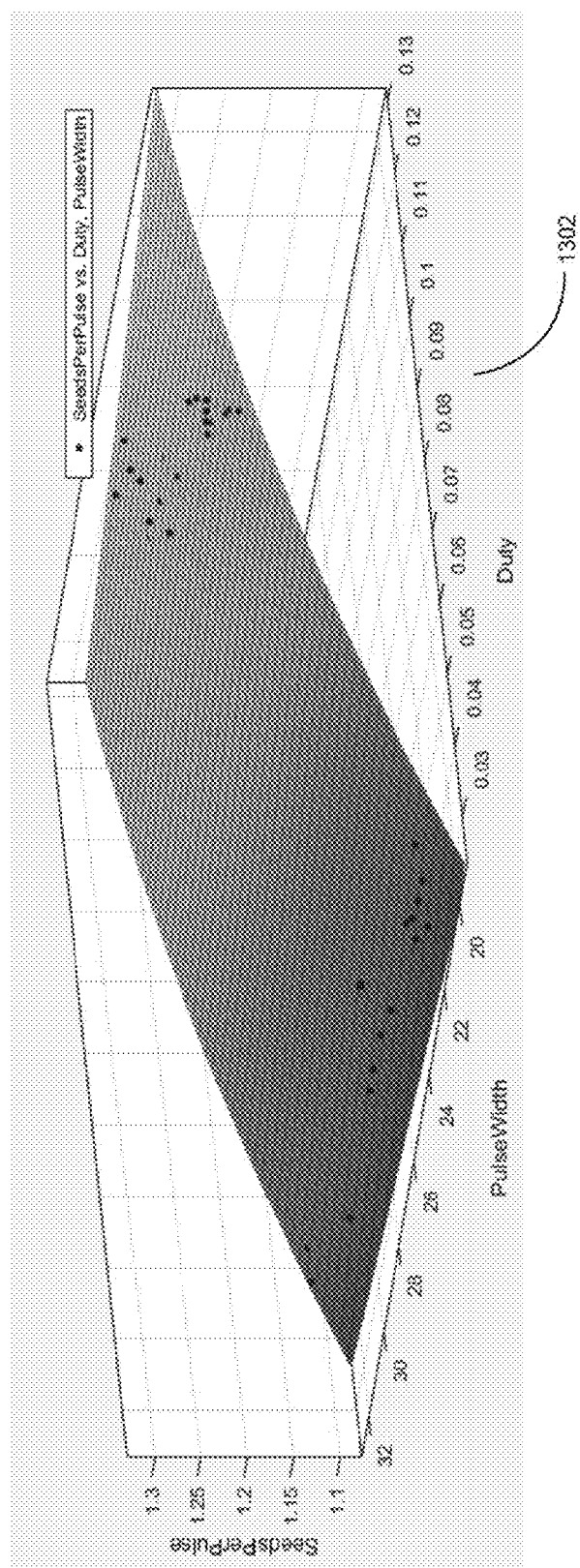
FIG. 13 shows an example of a curve of the estimated seeds per pulse against an average duty cycle and an average pulse width according to various embodiments.

Coefficients p00, p10, p01, p20, and p11 are calibrated using test data at development time, and may be calibrated for different seed types and/or seed sizes. FIG. 13 shows an example of a curve of the estimated seeds per pulse against the average duty cycle and the average pulse width for a particular seed type and/or seed size. Alternatively, lookup tables may be created based on the calibrated equation and curve (e.g., like the curve of FIG. 13) for the different seed types and/or sizes, and the controller 502 may simply utilize an appropriate lookup table for a particular seed type and/or size to determine a number of seeds per pulse based on the average duty cycle and the average pulse duty.

So configured, an object detection device 500 and multiple different methods for use with the object detection device 500 are disclosed that each serve to improve an object or seed counting accuracy of the object detection device 500. Additionally, with the use of such population type counting algorithms, counting of smaller seeds (such as wheat, oat, barley, rice, and canola) can be achieved at very high rates, even as high as 600 seeds per second. This allows for faster planting while maintaining an accurate desired seed distribution.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of

What is claimed is:

1. A method of adjusting a signal for an object sensing device to account for a level of noise in the signal to improve an object counting accuracy, the method comprising:
receiving, by a controller coupled to a plurality of electromagnetic radiation detectors, a radiation intensity signal corresponding to an intensity of electromagnetic radiation received by the plurality of radiation detectors;
determining, by the controller, that a value of the radiation intensity signal is within a voltage threshold, thereby indicating that no seed is passing through the electromagnetic radiation received by the plurality of radiation detectors;
determining, by the controller, a derivative of the radiation intensity signal;
determining, by the controller, that the derivative of the radiation intensity signal is less than a derivative threshold level for at least a predefined elapsed time; and
in response to determining that the value of the radiation intensity signal is within the voltage threshold and that the derivative of the radiation intensity signal is less than the derivative threshold level for at least the predefined elapsed time:
updating a base noise floor value to be the value of the radiation intensity signal.

2. The method of claim 1, further comprising:
scaling, by the controller, the radiation intensity signal according to the base noise floor value to generate a scaled radiation intensity signal.

3. The method of claim 2, wherein scaling the radiation intensity signal according to the base noise floor value further comprises dividing the radiation intensity signal by the base noise floor value to generate the scaled radiation intensity signal.

4. The method of claim 1, further comprising:
sensing, using the plurality of radiation detectors, a plane of electromagnetic radiation emitted from a plurality of radiation emitters within a seed passageway of a seeding machine, the plane of electromagnetic radiation substantially spanning a width of the seed passageway, the plurality of radiation emitters disposed on a first wall of the seed passageway, and the plurality of radiation detectors disposed on a second wall of the seed passageway opposite the first wall, wherein the plane of electromagnetic radiation is at least partially occluded at least by dust passing through the passageway.

5. The method of claim 1, further comprising:
filtering, by the controller, the base noise floor value using a low pass filter in comparison to at least one previous filtered base noise floor value to generate an updated filtered base noise floor value.

6. The method of claim 5, further comprising:
scaling, by the controller, the radiation intensity signal according to the updated filtered base noise floor value to generate a scaled radiation intensity signal.

7. The method of claim 1, further comprising:
receiving, by the controller coupled to the plurality of radiation detectors, a subsequent radiation intensity signal corresponding to an intensity of electromagnetic radiation received by the plurality of radiation detectors at a subsequent time;
determining, by the controller, that a value of the subsequent radiation intensity signal is outside of the voltage threshold for at least a predetermined elapsed abnormality time;
in response to determining that the value of the subsequent radiation intensity signal is outside of the voltage threshold for at least the predefined elapsed abnormality time:
determining, by the controller, a derivative of the subsequent radiation intensity signal;
determining, by the controller, that the derivative of the subsequent radiation intensity signal is less than the derivative threshold level for at least the predefined elapsed time; and
updating the base noise floor value to be the value of the subsequent radiation intensity signal.

8. The method of claim 2, further comprising:
detecting, by the controller, a pulse in the scaled radiation intensity signal exceeding a first pulse detection threshold; and
responsively determining, by the controller, that at least one seed passed through the electromagnetic radiation received by the plurality of radiation detectors during the pulse.

9. The method of claim 8, further comprising:
detecting, by the controller, a plurality of pulses in the scaled radiation intensity signal exceeding a first pulse detection threshold, the plurality of pulses corresponding to a plurality of seeds passing through the electromagnetic radiation;
determining, by the controller, an average pulse duty cycle of the plurality of pulses; and
estimating, by the controller, based on the average pulse duty cycle, a number of seeds that pass through the electromagnetic radiation during each pulse of the plurality of pulses.

10. The method of claim 9, further comprising:
determining an average pulse width for the plurality of pulses; and
estimating, by the controller, based on the average pulse duty cycle and the average pulse width, the number of seeds that pass through the electromagnetic radiation during each pulse of the plurality of pulses.

11. The method of claim 8, further comprising:
determining, by the controller, that a height of the pulse exceeds a second pulse detection threshold greater than the first pulse detection threshold; and
responsively determining, by the controller, that at least two seeds passed through the electromagnetic radiation during the pulse.

12. The method of claim 8, further comprising:
determining, by the controller, that a width of the pulse exceeds a pulse width detection threshold; and
responsively determining, by the controller, that at least two seeds passed through the electromagnetic radiation during the pulse.

13. The method of claim 8, further comprising:
determining, by the controller, a derivative of the pulse in the scaled radiation intensity signal;
determining that at least two peaks or at least two troughs exist in the derivative of the pulse; and
responsively determining, by the controller, that at least two seeds passed through the electromagnetic radiation during the pulse.

14. A seed sensing device comprising:
a controller coupled to a plurality of electromagnetic radiation (radiation) detectors within a seed passageway, the controller configured to:
  receive a radiation intensity signal corresponding to an intensity of electromagnetic radiation received by the plurality of radiation detectors;
  determine that a value of the radiation intensity signal is within a voltage threshold, thereby indicating that no seed is passing through the electromagnetic radiation received by the plurality of radiation detectors;
  determine a derivative of the radiation intensity signal;
  determine that the derivative of the radiation intensity signal is less than a derivative threshold level for at least a predefined elapsed time; and
  in response to determining that the value of the radiation intensity signal is within the voltage threshold and that the derivative of the radiation intensity signal is less than the derivative threshold level for at least the predefined elapsed time:
    update a base noise floor value to be the value of the radiation intensity signal.

15. The seed sensing device of claim 14, wherein the controller is further configured to:
  scale the radiation intensity signal according to the base noise floor value to generate a scaled radiation intensity signal.

16. The seed sensing device of claim 14, further comprising:
  a plurality of radiation emitters within the seed passageway of a seeding machine and configured to emit a plane of electromagnetic radiation substantially spanning a width of the seed passageway, the plurality of radiation emitters disposed on a first wall of the seed passageway, and
  the plurality of radiation detectors disposed on a second wall of the seed passageway opposite the first wall and configured to detect the plane of electromagnetic radiation, wherein the plane of electromagnetic radiation is at least partially occluded at least by dust passing through the passageway.

17. The seed sensing device of claim 14, wherein the controller is further configured to:
  filter the base noise floor value using a low pass filter in comparison to at least one previous filtered base noise floor value to generate an updated filtered base noise floor value; and
  scale the radiation intensity signal according to the updated filtered base noise floor value to generate a scaled radiation intensity signal.

18. The seed sensing device of claim 14, wherein the controller is further configured to:
  receive a subsequent radiation intensity signal corresponding to an intensity of electromagnetic radiation received by the plurality of radiation detectors at a subsequent time;
  determine that a value of the radiation intensity signal is outside of the voltage threshold for at least a predetermined elapsed abnormality time;
  wherein the controller is further configured to, in response to determining that the value of the subsequent radiation intensity signal is outside of the voltage threshold for at least the predefined elapsed abnormality time:
    determine a derivative of the subsequent radiation intensity signal;
    determine that the derivative of the subsequent radiation intensity signal is less than the derivative threshold level for at least the predefined elapsed time; and
    update the base noise floor value to be the value of the subsequent radiation intensity signal.

19. The seed sensing device of claim 15, wherein the controller is further configured to:
  detect a pulse in the scaled radiation intensity signal exceeding a first pulse detection threshold; and
  responsively determine that at least one seed passed through the electromagnetic radiation received by the plurality of radiation detectors during the pulse.

20. The seed sensing device of claim 19, wherein the controller is further configured to:
  determine that at least one of a height of the pulse exceeds a second pulse detection threshold greater than the first pulse detection threshold, or that a width of the pulse exceeds a pulse width detection threshold; and
  responsively determining, by the controller, that at least two seeds passed through the electromagnetic radiation during the pulse.

* * * * *